United States Patent
Schönlein et al.

(10) Patent No.: US 12,503,397 B2
(45) Date of Patent: Dec. 23, 2025

(54) MULTI-COMPONENT INORGANIC CAPSULE ANCHORING SYSTEM BASED ON GROUND-GRANULATED BLAST-FURNACE SLAG

(71) Applicant: Hilti Aktiengesellschaft, Schaan (LI)

(72) Inventors: Markus Schönlein, Gilching (DE); Armin Pfeil, Landsberg am Lech (DE); Bernhard Middendorf, Calden (DE); Tim Schade, Kassel (DE); Alexander Wetzel, Guxhagen (DE)

(73) Assignee: Hilti Aktiengesellschaft, Schaan (LI)

( * ) Notice: Subject to any disclaimer, the term of this patent is extended or adjusted under 35 U.S.C. 154(b) by 522 days.

(21) Appl. No.: 17/998,254

(22) PCT Filed: May 6, 2021

(86) PCT No.: PCT/EP2021/062014
§ 371 (c)(1),
(2) Date: Nov. 8, 2022

(87) PCT Pub. No.: WO2021/228685
PCT Pub. Date: Nov. 18, 2021

(65) Prior Publication Data
US 2023/0219848 A1    Jul. 13, 2023

(30) Foreign Application Priority Data

May 15, 2020  (EP) .................... 20174887

(51) Int. Cl.
| | | |
|---|---|---|
| C04B 28/00 | (2006.01) | |
| C04B 40/06 | (2006.01) | |
| C04B 111/00 | (2006.01) | |

(52) U.S. Cl.
CPC .......... C04B 28/006 (2013.01); C04B 40/065 (2013.01); *C04B 2111/00715* (2013.01)

(58) Field of Classification Search
CPC ............... C04B 28/006; C04B 40/065; C04B 2111/00715; Y02P 40/10; Y02W 30/91
See application file for complete search history.

(56) References Cited

U.S. PATENT DOCUMENTS

| | | | |
|---|---|---|---|
| 5,565,026 A | 10/1996 | Hense et al. | |
| 8,118,931 B2 | 2/2012 | Ellenrieder et al. | |
| 9,856,174 B2 | 1/2018 | Koch | |
| 2011/0100262 A1* | 5/2011 | Ellenrieder | C04B 28/26 |
| | | | 106/624 |
| 2016/0075852 A1 | 3/2016 | Lai | |
| 2016/0214899 A1 | 7/2016 | Koch | |
| 2022/0041503 A1 | 2/2022 | Pulkin et al. | |
| 2023/0174428 A1* | 6/2023 | Schönlein | C04B 40/065 |
| | | | 106/624 |
| 2023/0192566 A1* | 6/2023 | Schönlein | C04B 40/065 |
| | | | 106/624 |

FOREIGN PATENT DOCUMENTS

| | | |
|---|---|---|
| CA | 3124257 | 3/2020 |
| CN | 102046559 | 5/2011 |
| CN | 104513034 | 4/2015 |
| CN | 105073681 | 11/2015 |
| CN | 108975780 | 12/2018 |
| WO | 2010/017571 | 2/2010 |
| WO | 2017/196163 A2 | 11/2017 |
| WO | 2018/189295 | 10/2018 |

OTHER PUBLICATIONS

Li Qiuyi, et al., "Green Concrete Technology", Ch. 2.3 Ultrafine slag powder, China Building Industry Press, Sep. 2014, with English translation, 6 pages.
International Search Report dated Jul. 20, 2021, in PCT/EP2021/062014, 3 pages.
Written Opinion dated Jul. 20, 2021, in PCT/EP2021/062014, 5 pages.
Office Action received for U.S. Appl. No. 17/998,728, mailed on Jul. 9, 2025, 12 pages.
U.S. Appl. No. 17/998,728, filed Nov. 14, 2022, 2023/0174428, Schönlein et al.

* cited by examiner

*Primary Examiner* — Anthony J Green
(74) *Attorney, Agent, or Firm* — Grüneberg and Myers PLLC

(57) ABSTRACT

A multi-component inorganic capsule anchoring system can be used for chemically fastening anchors, bolts, screw anchors, screw bolts, and post-installed reinforcing bars in mineral substrates. The multi-component inorganic capsule anchoring system contains a curable powdery ground-granulated blast-furnace slag-based component A, and an initiator component B in aqueous-phase for initiating a curing process. The powdery ground-granulated blast-furnace slag-based component A contains further silica dust. The component B contains an alkali-silicate component and optionally a plasticizer.

20 Claims, No Drawings

MULTI-COMPONENT INORGANIC CAPSULE ANCHORING SYSTEM BASED ON GROUND-GRANULATED BLAST-FURNACE SLAG

CROSS-REFERENCE TO RELATED APPLICATIONS

This application is the National Stage entry under § 371 of International Application No. PCT/EP2021/062014, filed on May 6, 2021, and which claims the benefit of priority to European Application No. 20174887.8, filed on May 15, 2020. The content of each of these applications is hereby incorporated by reference in its entirety.

BACKGROUND OF THE INVENTION

Field of the Invention

The present invention pertains to a multi-component inorganic capsule anchoring system for a chemical fastening of anchors, bolts, screw anchors, screw bolts and post-installed reinforcing bars in mineral substrates, comprising a curable powdery ground-granulated blast-furnace slag-based component A and an initiator component B in aqueous-phase for initiating the curing process, wherein the powdery ground-granulated blast-furnace slag-based component A comprises further silica dust, and wherein component B comprises an alkali silicate-based component and optionally a plasticizer. Moreover, the present invention pertains to a method for a chemical fastening of anchoring means, preferably of metal anchors, bolts, screw anchors, screw bolts and post-installed reinforcing bars, in mineral substrates, such as structures made of brickwork, concrete, pervious concrete or natural stone using said multi-component inorganic capsule anchoring system.

Description of Related Art

Many mortar systems exist which provide a good chemical fastening of anchors, bolts, screw anchors, screw bolts and post-installed reinforcing bars in mineral substrates or surfaces. Predominantly mineral systems based on aluminous cement or the like have been developed.

When it comes to chemical fastening of anchors, bolts, screw anchors, screw bolts and post-installed reinforcing bars in mineral substrates, most of the known systems lack in sufficient fluidity for most practical applications of the resultant anchoring compositions.

Moreover, liquid systems or systems in slurry form exist that have to be mixed prior to the introduction into the borehole making application difficult, in particular with respect to overhead or under water applications, as liquid mortar can drop out of the borehole or can liquefy due to the surrounding water or moist. Often such prior art compositions also evidence a tendency to crack in a relatively short time or do not exhibit the required mechanical performance, in particular under certain conditions such as under the influence of elevated temperatures, in different conditioned boreholes as well as over a long period of time. Moreover, known systems tend to exhibit a large extend of shrinkage when applied in a borehole which results in an insufficient anchoring of the anchors bolts, screw anchors, screw bolts and post-installed reinforcing bars.

Therefore, there is a need for an inorganic capsule anchoring system, preferably a multi-component inorganic capsule anchoring system, which is superior over the prior art systems. In particular, it is of interest to provide a system that can be used fora chemical fastening of anchors bolts, screw anchors, screw bolts and post-installed reinforcing bars in mineral substrates without adversely affecting the handling characteristics, in particular with respect to overhead applications, under water applications, and the mechanical performance of the chemical anchoring system. Especially, there is a need for a system that provides increased load values when compared to the known systems. In addition, there is a need to improve load values by the addition of fillers or particles materials, such as an inorganic-based material, to lower the consumption of more expensive binder material or to improve some properties of the mixed material.

SUMMARY OF THE INVENTION

In view of the above, it is an object of the present invention to provide an inorganic capsule anchoring system, preferably a multi-component inorganic capsule anchoring system, in particular a two-component inorganic capsule anchoring system, which has an excellent mechanical performance, also over a long period of time, and at the same time has increased load values when compared to the known systems and which has advantages, in particular with regard to its direct application within the borehole, to under water applications and to overhead applications.

Moreover, it is an object of the present invention to provide a method for a chemical fastening of anchoring means, preferably of metal anchors bolts, screw anchors, screw bolts and post-installed reinforcing bars, in mineral substrates, such as structures made of brickwork, concrete, pervious concrete or natural stone, using this inorganic capsule anchoring system.

These and other objectives as they will become apparent from the ensuring description of the invention are solved by the present invention as described below. Preferred embodiments are described further below.

In one aspect, the present invention pertains to a multi-component inorganic capsule anchoring system comprising a curable powdery ground-granulated blast-furnace slag-based component A and an initiator component B in aqueous-phase for initiating the curing process, wherein the powdery ground-granulated blast-furnace slag-based component A comprises further silica dust, and wherein component B comprises an alkali silicate-based component and optionally a plasticizer. This provided system in capsule form is used for chemical fastening of anchoring means in mineral substrates.

In another aspect, the present invention pertains to a method for a chemical fastening of anchors, metal anchors, bolts, screw anchors, screw bolts and post-installed reinforcing bars in mineral substrates, which is characterized in that a multi-component inorganic capsule anchoring system is used for fastening, which comprises a curable powdery ground-granulated blast-furnace slag-based component A and an initiator component B in aqueous-phase for initiating the curing process, wherein the powdery ground-granulated blast-furnace slag-based component A comprises further silica dust, and wherein component B comprises an alkali silicate-based component and optionally a plasticizer. The mineral substrates are substrates such as structures made of brickwork, concrete, pervious concrete or natural stone.

DETAILED DESCRIPTION OF THE INVENTION

The following terms and definitions will be used in the context of the present invention:

As used in the context of present invention, the singular forms of "a" and "an" also include the respective plurals unless the context clearly dictates otherwise. Thus, the term "a" or "an" is intended to mean "one or more" or "at least one", unless indicated otherwise.

The term "binder" or "binder component" in the context of the present invention refers to the cementitious constituent and other additional optional components, such as for example fillers of the multi-component inorganic capsule anchoring systems. In particular, this is also referred to as the A component.

The term "initiator" or "initiator component" in the context of the present invention refers to the aqueous alkali silicate-based component, which triggers stiffening, solidification and hardening as a subsequent reaction. In particular, this is also referred to as a B component.

It has been surprisingly found out by the inventors, that the inorganic capsule anchoring system according to the present invention is an easy to handle ready-for-use system for a chemical fastening of anchors, metal anchors, bolts, screw anchors, screw bolts and post-installed reinforcing bars in mineral substrates, comprising a curable powdery ground-granulated blast-furnace slag-based component A and an initiator component B, especially when applied over a long period of time, and overhead. Further, this inorganic capsule anchoring system is particular suitable for fire-resistant and high-temperature applications as well as for under water applications, e.g. for the installation of oilrigs.

Moreover, it has been found that the multi-component inorganic capsule anchoring system of the present invention, in particular a two-component inorganic capsule anchoring system, allows for an easy application and fastening directly within the borehole without having to premix the components before introducing them into the borehole. When applied under water for example, the components of the inserted capsule are mixed by introducing the anchor rod into the borehole, the water surrounding the capsule is driven out and allows the anchor rod to be fastened.

Therefore, the present invention pertains to a multi-component inorganic capsule anchoring system comprising a curable powdery ground-granulated blast-furnace slag-based component A and an initiator component B in aqueous-phase for initiating the curing process, wherein the powdery ground-granulated blast-furnace slag-based component A comprises further silica dust, and wherein component B comprises an alkali silicate-based component and optionally a plasticizer.

Component A as used in the present invention is based on ground-granulated blast-furnace slag. The ground-granulated blast-furnace slag preferably comprises from 30 to 45% calcium oxide (CaO), from 30 to 45% silicon dioxide ($SiO_2$), from 1 bis 15% aluminum oxide ($Al_2O_3$) and from 4 to 17% Magnesium oxide (MgO), and 0.5 to 1% sulfur (S). Further characteristic contents of the ground-granulated blast-furnace slag are ferric oxide ($Fe_2O_3$), sodium oxide ($Na_2O$), potassium oxide ($K_2O$), chloride, sulfur trioxide ($SO_3$) and manganese oxide ($Mn_2O_3$), which preferably represent less than 5% of the ground-granulated blast-furnace slag.

Component A as used in the present invention comprises at least about 5 wt.-%, preferably at least about 10 wt.-%, more preferably at least about 20 wt.-%, most preferably at least about 30 wt.-%, from about 5 wt.-% to about 80 wt.-%, preferably from about 10 wt.-% to about 70 wt.-%, more preferably from about 20 wt.-% to about 60 wt.-%, most preferably from about 30 wt.-% to about 50 wt.-% of ground-granulated blast-furnace slag, based on the total weight of component A.

Further, component A as used in the present invention further comprises silica dust. The silica dust of the multi-component inorganic capsule anchoring system is present in a range of from 1 wt.-% to 10 wt.-%, preferably from 2 wt.-% to 8 wt.-%, most preferably in a range of from 4 wt.-% to 6 wt.-%, based on the total weight of component A. Preferably, the silica dust has an average particle size of 0.4 microns and a surface area of 180,000 to 220,000 $cm^2/g$ or 18-22 $m^2/g$, respectively.

Alternatively, the silica dust can also be replaced by Puzzolane materials or by materials with puzzolanic properties or by other fine reactive or inert fillers. These include corundum, calcite, dolomite, brick flour, rice peel ash, phonolite, calcined clay and metakaolin.

In a preferred embodiment of the cementitious multi-component mortar system, the silica dust is present in a range of 3 wt.-% to 7 wt.-%, based on the total weight of the binder.

Component A may additionally comprise a mineral filler. The mineral filler comprised in component A according to the present invention is selected from the group consisting of limestone fillers, sand, quartz, corundum, dolomite, crushed stones, gravels, pebbles and mixtures thereof, preferred are limestone fillers, coarse quartz, quartz powder, preferably quartz powder having an average grain size (d50%) of about 16 μm, quartz sand, quartz flour, clay, fly ash, fumed silica, carbonate compounds, such as various calcium carbonates, aluminas, pigments, titanium oxides, light fillers, corundum, and their mixtures. Suitable mineral fillers are commercially available products. Exemplarily mentioned is quartz powder Millisil W12 or W6 (Quarzwerke GmbH, Germany), quartz sand F32 (Quarzwerke GmbH, Germany), or Sewper Aggregates, such as SewperCoat® (Kerneos S.A, France). Component A comprises at least about 5 wt.-%, preferably at least about 10 wt.-%, more preferably at least about 20 wt.-%, still more preferably at least about 25 wt.-%, most preferably at least about 30 wt.-%, from about 5 wt.-% to about 95 wt.-%, preferably from about 10 wt.-% to about 70 wt.-%, more preferably from about 20 wt.-% to about 60 wt.-%, still more preferably from about 25 wt.-% to about 50 wt.-%, most preferably from about 30 wt.-% to about 40 wt.-% of mineral filler, based on the total weight of component A.

The mineral filler that can be used according to the present invention, is comprised in the powdery ground-granulated blast-furnace slag-based component A of the multi-component inorganic capsule anchoring system. The addition of the mineral filler lowers the consumption of more expensive binder material and improves some properties of the mixed material, results in an increase of load values and eases overhead and under water applications when the multi-component inorganic capsule anchoring system is in form of a two-component inorganic capsule anchoring system.

In an advantageous embodiment, component A as used in the present invention may further comprise the following characteristics, taken alone or in combination.

Component A may also additionally comprise a plasticizer in powder form. The plasticizer comprised in component A may be selected from the group consisting of low molecular weight (LMW) polyacrylic acid polymers, polycondensates, like e.g. sulfonated melamine formaldehydes, lingo-sulfonates, caseins, superplasticizers from the family of polyphosphonate polyox and polycarbonate polyox, and superplasticizers from the polycarboxylate ether family, and mixtures thereof, for example Melflux 4930 F or Melflux 5581 F (BASF Construction Solutions GmbH), Peramin SMF or Peramin CONPAC (Imerys Aluminates). Suitable plasticizers are commercially available products. Component A may comprise at least about 0.2 wt.-%, preferably at least about 0.3 wt.-%, more preferably at least about 0.4 wt.-%, most preferably at least about 0.5 wt.-%, from about 0.2 wt.-% to about 10 wt.-%, preferably from about 0.3 wt.-% to about 5 wt.-%, more preferably from about 0.4 wt.-% to about 4 wt.-%, most preferably from about 0.5 wt.-% to about 2 wt.-% of said plasticizer, based on the total weight of component A.

Furthermore, component A may contain other cements, such as calcium aluminate-based or Portland cement. Furthermore, component A may contain fibers, such as mineral fibers, man-made fibers, natural fibers, synthetic fibers, fibers of natural or synthetic polymers, fibers of inorganic substances, in particular carbon fibers or glass fibers.

The presence of mineral filler, accelerator, plasticizer in powder form does not change the overall inorganic nature of the cementitious-like component A.

Component B as used in the present invention comprises an alkali silicate-based component, in particular an alkali metal silicate-based component, wherein the alkali metal silicate is selected from the group consisting of sodium silicate, potassium silicate, lithium silicate, modifications thereof, mixtures thereof and aqueous solutions thereof.

It is also possible, that component B as used in the present invention comprises an alkali- or earth alkali hydroxide or -carbonate, such as lithium hydroxide, sodium hydroxide, potassium hydroxide, calcium hydroxide, magnesium hydroxide, lithium carbonate, sodium carbonate or potassium carbonate, mixtures thereof or aqueous solutions thereof.

In a preferred embodiment, the alkali silicate-based component used in the initiator component B is an aqueous solution of potassium silicate and potassium hydroxide. In a particularly preferred embodiment, the initiator component is an aqueous solution of 10 mol/l KOH and 1.72 mol/l potassium silicate (Betol® K 35 T, woellner, Germany).

In a preferred embodiment of the present invention, the alkali silicate-based initiator component comprises from 1 to 50 wt.-% silicate, preferably 10 to 40 wt.-%, most preferably 15 to 30 wt.-%, based on the total weight of the aqueous alkali metal silicate.

The initiator component comprises at least about 0.01 wt.-%, preferably at least 0.02, particularly preferably at least about 0.05 wt.-%, particularly preferably at least 1 wt.-%, of about 0.01 to about 40 wt.-%, preferably from about 0.02 to about 35 wt.-%, more preferably from about 0.05 to about 30 wt.-%, particularly preferably from about 1 to about 25 wt.-% of the alkali silicate-based component, based on the total weight of the initiator component.

Component B as used in the present invention comprises optionally a plasticizer. The optionally plasticizer comprised in component B of the present invention is selected from the group consisting of low molecular weight (LMW) polyacrylic acid polymers, polycondensates, like e.g. sulfonated melamine formaldehydes, lingosulfonates, caseins, superplasticizers from the family of polyphosphonate polyox and polycarbonate polyox, and superplasticizers from the polycarboxylate ether family, and mixtures thereof, for example Ethacryl™ G (Coatex, Arkema Group, France), Acumer™ 1051 (Rohm and Haas, U.K.), Sika® ViscoCrete®-2520 (Sika, Germany) or Sika® ViscoCrete®-20 HE (Sika, Germany). Suitable plasticizers are commercially available products.

Component B comprises at least about 2 wt.-%, preferably at least about 5 wt.-%, more preferably at least about 10 wt.-%, most preferably at least about 15 wt.-%, from about 2 wt.-% to about 40 wt.-%, preferably from about 5 wt.-% to about 35 wt.-%, more preferably from about 10 wt.-% to about 30 wt.-%, most preferably from about 15 wt.-% to about 25 wt.-% of said plasticizer, based on the total weight of component B.

Furthermore, at least one filler or filler mixtures may be present in the initiator component. These are preferably selected from the group consisting of quartz, sand, quartz flour, pigments, titanium oxides, light fillers, limestone fillers, corundum, dolomite, alkali-resistant glass, crushed stones, pebbles and mixtures thereof.

Component B may additionally comprise a thickening agent. The thickening agent to be used in the present invention may be selected from the group consisting of bentonite, silicon dioxide, quartz, thickening agents based on acrylate, such as alkali-soluble or alkali-swellable emulsions, fumed silica, clay and titanate chelating agents. Exemplarily mentioned are polyvinyl alcohol (PVA), hydrophobically modified alkali soluble emulsions (HASE), hydrophobically modified ethylene oxide urethane polymers known in the art as HEUR, and cellulosic thickeners such as hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, 2-hydroxypropyl cellulose, attapulgite clay, and mixtures thereof. Suitable thickening agents are commercially available products, such as Optigel WX (BYK-Chemie GmbH, Germany), Rheolate 1 (Elementis GmbH, Germany) and Acrysol ASE-60 (The Dow Chemical Company). Component B may comprise at least about 0.01 wt.-%, preferably at least about 0.05 wt.-%, more preferably at least about 0.1 wt.-%, most preferably at least about 0.2 wt.-%, from about 0.01 wt.-% to about 15 wt.-%, preferably from about 0.05 wt.-% to about 10 wt.-%, more preferably from about 0.1 wt.-% to about 5 wt.-%, most preferably from about 0.2 wt.-% to about 1 wt.-% of said thickening agent, based on the total weight of component B.

Component B may further comprise an antibacterial or biocidal agent. The antibacterial or biocidal agents which can be used in the present invention may be selected from the group consisting of compounds of the isothiazolinone family, such as methylisothiazolinone (MIT), octylisothiazolinone (OIT) and benzisothiazolinone (BIT) and their mixtures.

The presence of a plasticizer, thickening agent, filler antibacterial or biocidal agent and/or accelerator in liquid form does not change the overall inorganic nature of the component B.

Component B is present in aqueous phase, preferably in form of a liquid. In an alternative embodiment, component B may also be present in form of a slurry or paste.

The weight ratio between component A and component B (A/B) is preferentially comprised between 8/1 and 1/3, preferably is 4.5/1. Preferably, the composition of the mixture comprises 82 wt.-% of component A and 18 wt.-% of component B. In an alternative embodiment, the composition of the mixture comprises 25 wt.-% of component A and 75 wt.-% of component B.

It is preferred that the multi-component inorganic capsule anchoring system has an initial set-time of at least 1 min, preferably of at least 2 min, more preferably of at least 3 min, most preferably of at least 5 min, in particular in the range of from about 5 to 25 min, preferably in the range of about 5 to 20 min, after mixing of the two components A and B.

In the multi-component inorganic capsule anchoring system, especially the two-component inorganic capsule anchoring system, the volume ratio of cementitious component A to component B is 1:1 to 8:1, preferably is 2:1. In an alternative embodiment, the volume ratio of cementitious component A to component B is 1:3 to 1:2.

The multi-component inorganic anchoring system is preferably a ready-for-use system, whereby component A and B are in a multi-chamber device, such as a multi-chamber cartridge, a multi-chamber cylinder and/or a multi-chamber capsule, preferably a two-component capsule. In particular, the two-component inorganic capsule anchoring system includes two foil bags for separating curable component A and initiator component B. In an alternative embodiment, the two-component inorganic capsule is made of glass or paper. The two-component inorganic capsule can also be referred to as capsule-in-capsule, foil-in-foil or glass-in-glass. The contents of the capsules are mixed together by inserting the inorganic anchoring system into the borehole, introducing the anchoring device thereby destroying the capsule and mixing component A and B directly within the borehole ready for setting and chemically fastening the anchoring means.

In particular, the multi-component inorganic capsule anchoring system is to be considered as a chemical anchor for fastening anchoring means, such as metal anchors, bolts, screw anchors, screw bolts and post-installed reinforcing bars or the like into mineral substrates, such as structures made of brickwork, concrete, pervious concrete or natural stone. It is preferred that the multi-component inorganic capsule anchoring system is used for fastening anchor rods in boreholes.

Moreover, the multi-component inorganic capsule anchoring system may be used for the attachment of fibers, scrims, fabrics or composites, in particular of high-modulus fibers, preferably of carbon fibers, in particular for the reinforcement of building structures, for example walls or ceilings or floors, or further for mounting components, such as plates or blocks, e.g. made of stone, glass or plastic, on buildings or structural elements. However, in particular it is used for fastening of anchoring means, preferably metal anchors and post-installed reinforcing bars, such as anchor rods, in particular threaded rods, bolts, steel reinforcement bars or the like into recesses, such as boreholes, in mineral substrates, such as structures made of brickwork, concrete, pervious concrete or natural stone, whereby the components of the multi-component inorganic capsule anchoring system are mixed, for example by destroying the capsule or a plastic/film bag.

The inventive multi-component inorganic capsule anchoring system preferably is contained separately in a two-chamber capsule so as to inhibit reaction and can be caused to react under use conditions. Moreover, the component A and the component B are produced separately from each other, so that the one component usually contains the curable powdery cement, while the other component contains the initiator component B including the silicate-based component. The fillers, as well as the remaining components, may be contained in the one or also the other component.

The two-chamber and multi-chamber systems, in which the inventive, multi-component inorganic capsule anchoring system is present, include especially cartridges of glass, plastic, plastic sheets, metallic foils or ceramic, in the interior of which the curable component is kept separate from the initiator component agent by walls, which can be destroyed. Such cartridge or capsule systems are placed in the boreholes. To initiate the curing reaction, the cartridges or capsules, including the partitions contained therein, are destroyed, for example, by driving anchoring means, such as a tie bar, into them.

The following example illustrates the invention without thereby limiting it.

EXAMPLES

There are only one-component inorganic capsule systems known, which have to be immersed in water to be ready for using their content for chemical fastening. These are not suitable for overhead and under water applications, they are not easy to handle and to portion. These one-component systems are for example Denka Quick capsules (Denka Co. Ltd., Japan) or Ambex systems from Ambex Concrete Repair Solutions, Canada. Other known two-component systems have to be pre-mixed outside of the borehole and require several additional tools and working steps, e.g. Cemeforce (Sumitomo Osaka Cement Co. Ltd., Japan).

1. Composition of the Ground-Granulated Blast-Furnace Slag

TABLE 1

| | | RFA-analysis slag. | | | | | |
|---|---|---|---|---|---|---|---|
| | Slag Name | H4000 | H6000 | H8000 | H10000 | H12000 | H15000 |
| Oxides | $SiO_2$ | 38.1 | 38.21 | 38.36 | 38.63 | 38.51 | n.d. |
| [M.-%] | $Al_2O_3$ | 9.89 | 9.90 | 9.94 | 10.09 | 10.02 | n.d. |
| (RFA) | $Fe_2O_3$ | 0.41 | 0.42 | 0.40 | 0.37 | 0.41 | n.d. |
| | CaO | 40.33 | 40.31 | 39.95 | 39.44 | 39.68 | n.d. |
| | MgO | 5.68 | 5.71 | 5.74 | 5.83 | 5.79 | n.d. |
| | $SO_3$ | 2.74 | 2.68 | 2.72 | 2.77 | 2.74 | n.d. |
| | S | 1.12 | 1.03 | 1.13 | 1.12 | 1.10 | n.d. |
| | $Na_2O$ | 0.41 | 0.40 | 0.41 | 0.41 | 0.42 | n.d. |
| | $K_2O$ | 0.74 | 0.74 | 0.76 | 0.75 | 0.75 | n.d. |
| | $Mn_2O_3$ | 0.58 | 0.58 | 0.58 | 0.58 | 0.57 | n.d. |
| | Cl | 0.01 | 0.01 | 0.01 | 0.01 | 0.01 | n.d. |

TABLE 1-continued

RFA-analysis slag.

| Slag Name | H4000 | H6000 | H8000 | H10000 | H12000 | H15000 |
|---|---|---|---|---|---|---|
| Fineness of slag in $cm^2/g$ (Blaine) | 4000 | 6000 | 8000 | 10000 | 12000 | 15000 |
| Size distribution (μm) | 0.1-100 | 0.1-60 | 0.1-40 | 0.1-20 | 0.1-10 | 0.1-10 | n.d.: not determined

2. Preparation of Component A and Component B

The powdery cementitious component A as well as the liquid initiator component B of the examples are initially produced by mixing the constituents specified in Tables 2 and 3, respectively, with those specified in Table 4. The proportions that are given are expressed in wt.-%.

TABLE 2

Composition of component A based on ground-granulated blast-furnace slag [wt.-%].

| | Binder H4000 | Binder H6000 | Binder H8000 | Binder H10000 | Binder H12000 | Binder H15000 | Binder Silica dust[1] | Filler Sand[2] | Filler Quartz-powder[3] |
|---|---|---|---|---|---|---|---|---|---|
| A0 | 34.5 | | | | | | 7.5 | 50 | 8 |
| A1 | | 34.5 | | | | | 7.5 | 50 | 8 |
| A2 | | | 34.5 | | | | 7.5 | 50 | 8 |
| A3 | | | | 34.5 | | | 7.5 | 50 | 8 |
| A4 | | | | | 34.5 | | 7.5 | 50 | 8 |
| A5 | | | | | | 34.5 | 7.5 | 50 | 8 |

[1] Silica dust: fineness in $cm^2/g$ (Blaine) 180.000-220.000; size distribution (μm) 0.1-10.
[2] Sand: size distribution (μm) 125-1000.
[3] Quartz powder: size distribution (μm) 0.1-100.

TABLE 3

Composition of component B (wt.-%).

| | Initiator KOH 10 mol/l | Initiator $K_2SiO_3$ 1.72 mol/l |
|---|---|---|
| B | 50 | 50 |

TABLE 4

Mixing ratio of component A to component B.

| Component A | Component B | A/B-Ratio | Water/Binder Ration |
|---|---|---|---|
| A0 | B | 0.132 | 0.2 |
| A1 | B | 0.150 | 0.225 |
| A2 | B | 0.165 | 0.25 |
| A3 | B | 0.182 | 0.275 |
| A4 | B | 0.198 | 0.3 |
| A5 | B | 0.231 | 0.35 |

3. Determination of Mechanical Performance

After being produced separately, the powdery binder component A and initiator component B are mixed in a stainless steel sleeve borehole having a diameter of 12 mm, an anchoring depth of 32 mm and ground undercuts of 0.33 mm with an M8 threaded anchor rod with a length of 100 mm. The load values of the cured mortar compositions are determined at certain times within 24 hours by using a device for testing materials "Zwick Roell Z050" (Zwick GmbH & Co. KG, Ulm, Germany). The stainless steel sleeve is fastened on a plate while the threaded anchor rod is fixed to the force measuring device with a nut. With a preload of 500 N and a testing rate of 3 mm/min the failure load is determined by centrally pulling out the threaded anchor rod. Each example consists of a mean value of five pull-outs. Ultimate failure loads are calculated as inner strengths and given in $N/mm^2$ in Table 5.

TABLE 5

Inner strengths in $N/mm^2$.

| Example | Components | Temperatur | Setting time in min | Inner strengths in $N/mm^2$ |
|---|---|---|---|---|
| 1 | A0 + B | 20° C. | 26 | 23.5 |
| 2 | A1 + B | 20° C. | 19 | 25.9 |
| 3 | A2 + B | 20° C. | 15 | 27.1 |
| 4 | A3 + B | 20° C. | 12 | 28.2 |
| 5 | A4 + B | 20° C. | 10 | 29.9 |
| 6 | A5 + B | 20° C. | 8 | 30.2 |
| 7 | A0 + B | 0° C. | 90 | 4.2 |
| 8 | A4 + B | 0° C. | 18 | 7.7 |
| 9 | A0 + B | 5° C. | 55 | 11.0 |
| 10 | A4 + B | 5° C. | 13.5 | 17.1 |
| 11 | A0 + B | 10° C. | 36 | 16.4 |
| 12 | A4 + B | 10° C. | 11.5 | 19.5 |

As it can be seen from Table 5, all measurable systems show considerable inner strengths after 24 hours of curing as well as increased load values and hence, improved mechanical strength means. As it has been shown additionally above, that the use of finely ground binders in particular with a fineness in a range of 4,000-15,000 cm$^2$/g, preferably a particle fineness of 6,000-12,000 cm$^2$/g provides for an increase in load values and hence mechanical strength.

In General, the multi-component inorganic capsule anchoring system has an excellent mechanical performance, also over a long period of time, and at the same time high load values, which has advantages, in particular with regard to its direct application within the borehole, in fire conditions and under elevated temperature as well as under water and overhead.

The invention claimed is:

1. A multi-component inorganic capsule anchoring system for chemical fastening of anchors, bolts, screw anchors, screw bolts and post-installed reinforcing bars in mineral substrates, comprising:
    a curable powdery ground-granulated blast-furnace slag-based component A, and
    an initiator component B in aqueous-phase for initiating a curing process,
    wherein component A comprises silica dust,
    wherein component B comprises an alkali-silicate-based component and, optionally, a plasticizer,
    wherein component A and component B are present in a multi-chamber device, and
    wherein the multi-chamber device is a multi-chamber cartridge, a multi-chamber cylinder, and/or a multi-chamber capsule.

2. The multi-component inorganic capsule anchoring system according to claim 1, wherein component A comprises ground-granulated blast-furnace slag in a range of from about 10 wt.-% to about 70 wt.-%, based on a total weight of component A.

3. The multi-component inorganic capsule anchoring system according to claim 1, wherein component A further comprises a mineral filler selected from the group consisting of a limestone filler, sand, quartz, corundum, dolomite, crushed stone, gravel, pebbles, and a mixture thereof.

4. The multi-component inorganic capsule anchoring system according to claim 1, wherein the alkali silicate-based component comprises an alkali metal silicate selected from the group consisting of sodium silicate, potassium silicate, lithium silicate, a modification thereof, a mixture thereof, and an aqueous solution thereof.

5. The multi-component inorganic capsule anchoring system according to claim 1, wherein the alkali silicate-based component is an aqueous solution of potassium silicate and potassium hydroxide.

6. The multi-component inorganic capsule anchoring system according to claim 1, wherein the multi-component inorganic capsule anchoring system is a two-component inorganic capsule anchoring system.

7. The multi-component inorganic capsule anchoring system according to claim 6, wherein the two-component inorganic capsule anchoring system is in a form of a glass capsule.

8. A chemical anchor for chemical fastening of an anchor in a mineral substrate, obtained by mixing component A and component B of the multi-component inorganic capsule anchoring system according to claim 1.

9. A method, comprising:
    chemically fastening an anchor or post-installed reinforcing bar in a mineral substrate, with a multi-component inorganic capsule anchoring system,
    wherein the multi-component inorganic capsule anchoring system comprises:
    a curable powdery ground-granulated blast-furnace slag-based component A, and
    an initiator component B in aqueous-phase for initiating a curing process,
    wherein component A comprises silica dust, and
    wherein component B comprises an alkali-silicate-based component and, optionally, a plasticizer.

10. The method according to claim 9, wherein the multi-component inorganic capsule anchoring system is a two-component inorganic capsule anchoring system.

11. The method according to claim 10, wherein the two-component inorganic capsule anchoring system is in a form of a glass capsule.

12. The method according to claim 9, wherein component A and component B are in a multi-chamber device.

13. The multi-component inorganic capsule anchoring system according to claim 6, wherein component A and component B are in different chambers in the two-component inorganic capsule.

14. The multi-component inorganic capsule anchoring system according to claim 1, wherein component A and component B are in different chambers of the multi-chamber device.

15. The multi-component inorganic capsule anchoring system according to claim 14, wherein the multi-chamber device is a multi-chamber capsule.

16. The multi-component inorganic capsule anchoring system according to claim 15, wherein the multi-chamber device is a two-component inorganic capsule including two foil bags which separate components A and B.

17. The method according to claim 10, comprising mixing together the contents of the capsules by inserting the inorganic anchoring system into a borehole, thereby destroying the capsule and mixing component A and B.

18. A multi-component inorganic capsule anchoring system, comprising:
    a curable powdery ground-granulated blast-furnace slag-based component A, and
    an initiator component B in aqueous-phase for initiating a curing process,
    wherein component A comprises silica dust,
    wherein component B comprises an alkali-silicate-based component and, optionally, a plasticizer,
    wherein component A and component B are present in a multi-chamber device, and
    wherein component A comprises 1 to 10 wt. % of silica dust and 20 to 60 wt. % of ground-granulated blast furnace slag, and 10 to 70 wt. % of a mineral filler, based on the total weight of component A.

19. The multi-component inorganic capsule anchoring system according to claim 18, wherein the mineral filler comprises sand and quartz powder.

20. The multi-component inorganic capsule anchoring system according to claim 19, wherein the alkali silicate-based component is an aqueous solution of potassium silicate and potassium hydroxide.

* * * * *